Aug. 17, 1954 R. H. GRIFFIN 2,686,414
SKIN TREATING APPARATUS
Filed May 2, 1950 11 Sheets-Sheet 1

Inventor:
Robert H. Griffin
By Wilmer Mechlin
his Attorney

Inventor:
Robert H. Griffin
By (signature)
his Attorney

Aug. 17, 1954 R. H. GRIFFIN 2,686,414
SKIN TREATING APPARATUS
Filed May 2, 1950 11 Sheets-Sheet 5

Inventor:
Robert H. Griffin
By Wilmer Mechlin
his Attorney

Aug. 17, 1954   R. H. GRIFFIN   2,686,414
SKIN TREATING APPARATUS
Filed May 2, 1950   11 Sheets-Sheet 6

Inventor:
Robert H. Griffin
By Wilmer Mechlin
his Attorney

Aug. 17, 1954 R. H. GRIFFIN 2,686,414
SKIN TREATING APPARATUS
Filed May 2, 1950 11 Sheets-Sheet 7
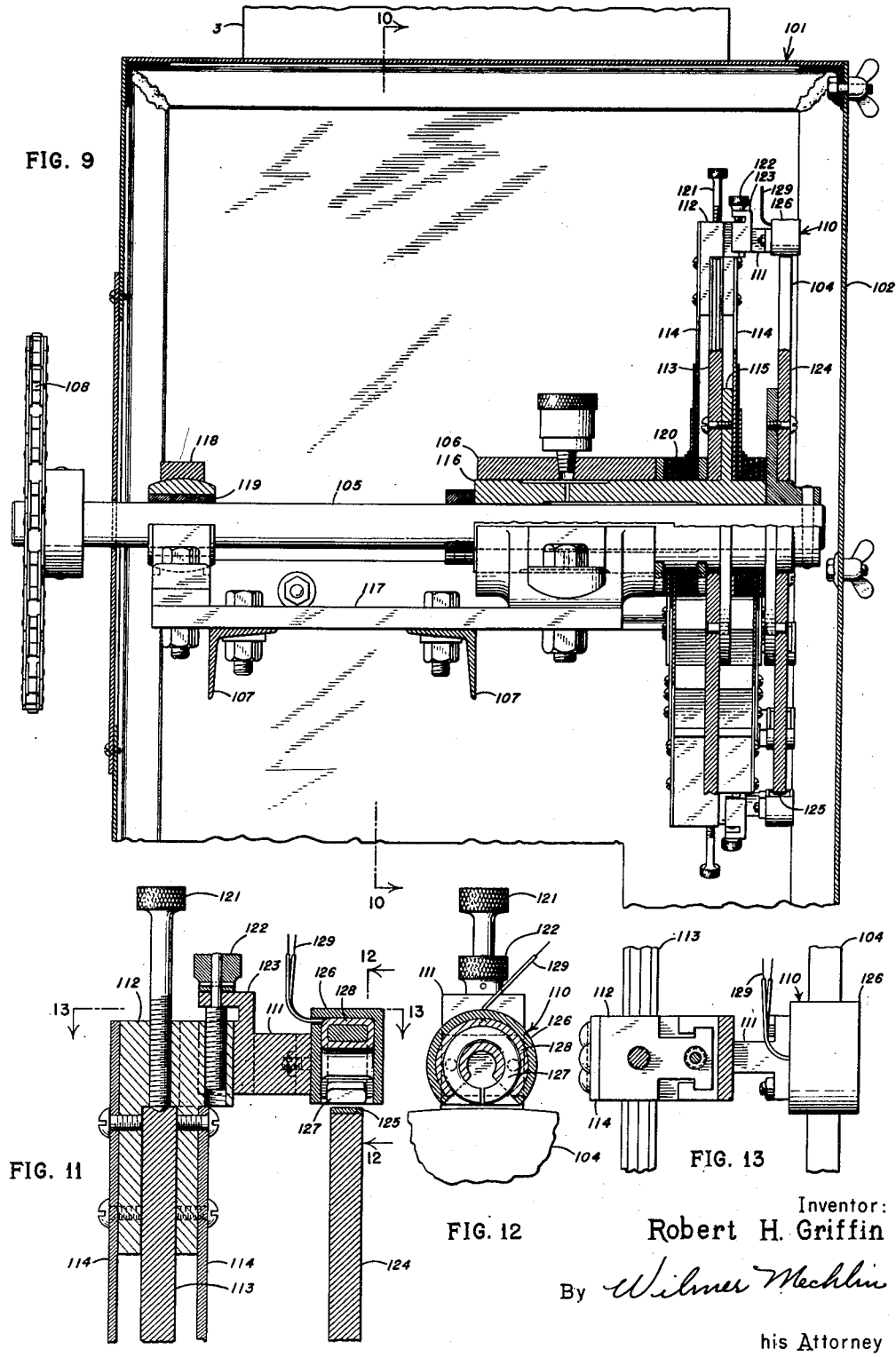
Inventor:
Robert H. Griffin
By Wilmer Mechlin
his Attorney Aug. 17, 1954  R. H. GRIFFIN  2,686,414
SKIN TREATING APPARATUS
Filed May 2, 1950  11 Sheets-Sheet 8

Inventor:
Robert H. Griffin
By Wilmer Mechlin
his Attorney

Inventor:
Robert H. Griffin
By Wilmer Mechlin
his Attorney

Aug. 17, 1954    R. H. GRIFFIN    2,686,414
SKIN TREATING APPARATUS
Filed May 2, 1950    11 Sheets-Sheet 10
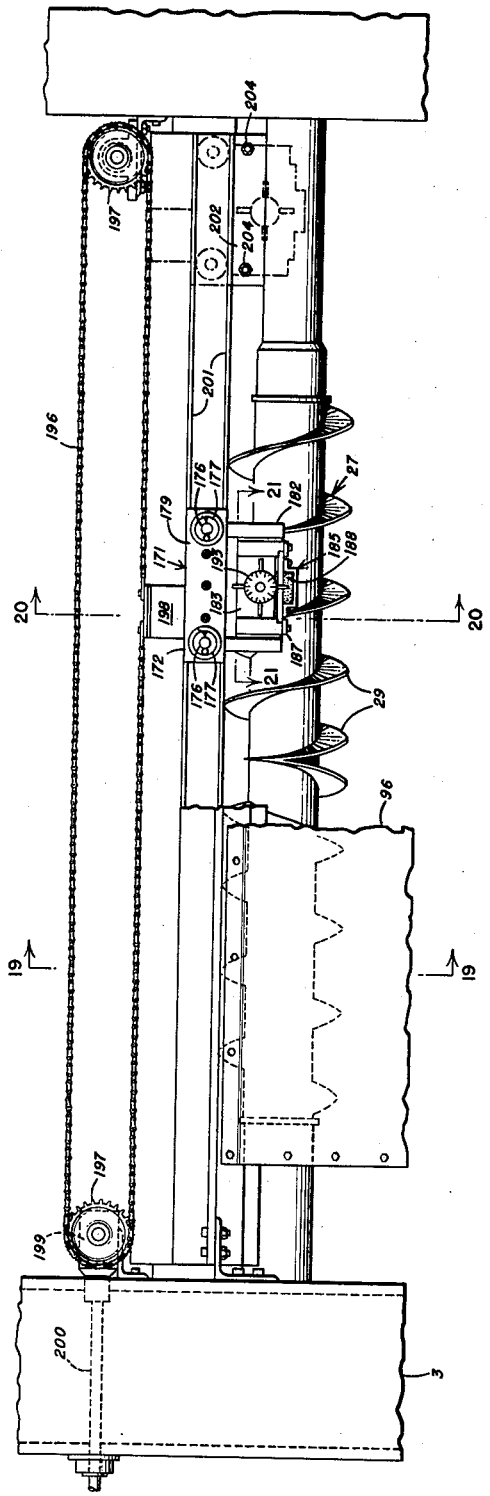
FIG. 18
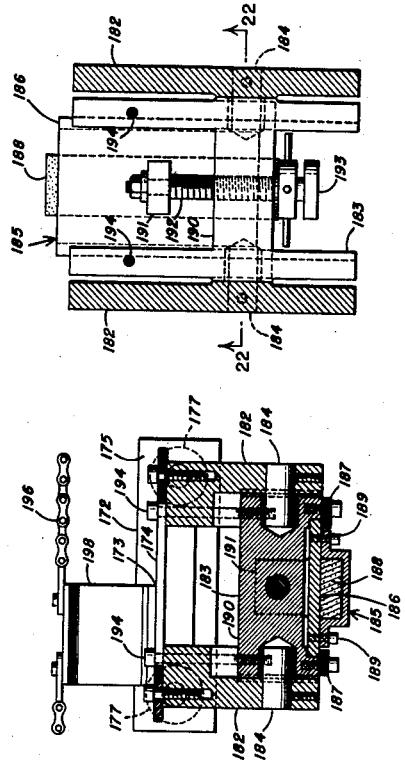
FIG. 21
FIG. 22
Inventor:
Robert H. Griffin
By Wilmer Mechlin
his Attorney Aug. 17, 1954

R. H. GRIFFIN 2,686,414

SKIN TREATING APPARATUS

Filed May 2, 1950

Inventor:
Robert H. Griffin
By Wilmer Mechlin
his Attorney

Patented Aug. 17, 1954

2,686,414

UNITED STATES PATENT OFFICE 2,686,414

SKIN TREATING APPARATUS

Robert H. Griffin, Yonkers, N. Y., assignor to Tanners' Research Corporation, New York, N. Y., a corporation of Delaware Application May 2, 1950, Serial No. 159,436

30 Claims. (Cl. 69—41)

This invention relates to the treatment of sheet material and particularly to apparatus for treating skins, hides and other sheet material, such as disclosed in my copending applications Serial No. 703,571, filed October 16, 1946, and Serial No. 42,652, filed August 5, 1948, of which the present invention is an improvement.

The primary object of the invention is to provide improved apparatus for subjecting sheet material to one or more treatments as a continuous process.

An object of the invention is to provide improved apparatus for treating both faces of sheet material in their entireties in a single pass.

Another object of the invention is to provide apparatus for continuously processing a succession of individual sheets of material wherein the opposite faces of the sheets are subjected to the same or different treatments in individual cycles automatically varying with and determined by the characteristics of each sheet.

An additional object of the invention is to provide apparatus for treating sheet material having means for exteriorly gripping the material to a rotary work support, while enabling the exposed face of the material to be treated in its entirety.

Another object of the invention is to provide apparatus for treating sheet material having electronic means actuated by the material for automatically controlling its treatment, wherein the control is such as to permit successive sheets of different characteristics to be fed to the apparatus in rapid and close succession and treated with like uniformity.

A further object of the invention is to provide apparatus for treating sheet material wherein the treating devices are cyclically operated by an electronic control which is readily adjustable to encompass desired variations in the operative cycle.

A further object of the invention is to provide skin treating apparatus for treating the opposite faces of a skin in their entireties in a single pass, in which a skin is carried through the apparatus on a series of continuous conveyors and positively transferred from one to the succeeding conveyor.

An additional object of the invention is to provide apparatus for unhairing and fleshing the corresponding faces of a skin in their entireties in a single pass, wherein the skin is so acted on by the treating means as to contain the hair and flesh removed as waste matter from the skin within relatively narrow confines, enabling the hair and flesh to be segregated and directed into separate hoppers from which they are readily removed as discrete by-products, thereby avoiding the usual necessity both for interrupting operation of the beam-house machines while waste is removed from them and the floor of the beam-house, and for subsequently separating the contaminated waste, in which hair and flesh are commingled, into its valuable by-product ingredients.

Another object of the invention is to provide skin treating apparatus utilizing rotary cutters for removing undesired natural matter from a skin, wherein means are provided for sharpening the cutters in situ.

Other objects and advantages of the invention will appear hereinafter in the detailed description, be particularly pointed out in the appended claims and illustrated in the accompanying drawings, in which:

Figure 5 is a vertical sectional view, taken along the lines 5—5 of Figure 1;

Figure 7 is a fragmentary view on an enlarged scale of the fluid pressure device for discharging a skin from the feed conveyor, the view being taken on the same section as Figure 5;

Figure 9 is a side elevational view on an enlarged scale of the control unit of Figure 8 with portions removed and shown in section to more clearly illustrate certain of the details of construction;

Figure 11 is a fragmentary vertical sectional view on an enlarged scale, taken along the lines 11—11 of Figure 8, showing in cross-section a typical magnetic head and the disposition of its components relative to the recorder disk;

Figure 12 is a fragmentary vertical sectional view, taken along the lines 12—12 of Figure 11;

Figure 13 is a fragmentary horizontal sectional view, taken along the lines 13—13 of Figure 11;

Figure 18 is a fragmentary front elevational view on an enlarged scale showing the sharpening mechanism for sharpening the blades of the fleshing cylinder;

Figure 21 is a fragmentary horizontal sectional view, taken along the lines 21—21 of Figure 18;

Figure 22 is a horizontal sectional view, taken along the lines 22—22 of Figure 21; and Figure 23 is a fragmentary vertical sectional view, taken along the lines 23—23 of Figure 1 and showing the intergearing of the first grip roll and the unhairing drum.

Figure 6:
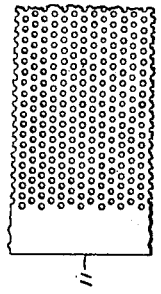
Figure 6 is a fragmentary view on an enlarged scale showing the construction of the feed conveyor.

Referring now in detail to the drawings in which like reference characters designate like parts, the apparatus of the present invention is applicable to sheet material and is especially adapted to handle a succession of skins, hides and like individual or non-continuous sheets of material. The apparatus of the illustrated embodiment of the invention is particularly designed, as were those of the aforementioned copending applications, to perform upon a skin the so-called "beam-house" operations in which excess natural matter or tissue, predominantly hair and flesh, is removed from the opposite sides of a skin, usually at the outset of the tanning process. The apparatus is comprised of a frame 1 having a base 2 and laterally or transversely spaced sides or uprights 3. While the frame may be made of weldments or other suitable construction, the illustrated frame is cast, with the sides 3 connected across their upper ends by transverse I-beams 4 which may project beyond either one or both sides of the apparatus and with a connecting longitudinal I-beam 5, may also serve as tracks for supporting hoists, such as shown in my copending application Serial No. 126,546, filed November 10, 1949.

The illustrated apparatus is designed to treat the opposite sides, faces or surfaces of a skin, designated on the drawings as S, at separate positions or zones along its path of travel through the apparatus. There is provided for this purpose a movable work support at each position in the form of a rotary supporting or back-up drum or cylinder, the one for presenting for treatment the hair face of the skin, numbered 6, hereinafter referred to as the "unhairing drum" and that for the flesh face, numbered 7, hereinafter termed the "fleshing drum." Each of these drums is mounted on a shaft 8 extending between the sides 3 of the frame and rotatably mounted in journals 9 positioned in openings 10 in the sides. For better arrangement and to facilitate handling a succession of skins of varying lengths, the drums are preferably positioned somewhat apart, with one space somewhat behind and above the other to accommodate the associated mechanisms, as well as for better control of the travel of the skins. For feeding and carrying skins through the apparatus, use is made of a system or series of endless belt or like conveyors. Since a skin will normally be wet from previous treatment when introduced into the apparatus and its flesh face or side in that condition has better adherence to a belt, it is preferred first to treat the opposite or hair face or side of a skin. Accordingly, the first position or zone at which a skin is treated is occupied by the first, upper or unhairing drum 6 to which it is fed by a feed or infeed endless belt conveyor 11. As it passes beyond the stations of the treating devices associated with the unhairing drum, the skin, still in contact with the feed conveyor, is supported on an intermediate conveyor 12 encircling the second, lower or fleshing drum 7, by which it is carried to and around the latter drum. The skin is then transferred to a third or end conveyor 13, by which it is deposited on a fourth or discharge conveyor 14, which carries the skin out of the apparatus. Of the several conveyors, the feed and intermediate conveyors are driven by the supporting drums which they encircle and the end and discharge conveyors by drive pulleys or rollers 15 and 16, respectively, the several conveyors riding therebeyond on idler pulleys or rollers.

It has heretofore been contemplated to provide suction for causing a skin to be gripped to a feed conveyor to ensure proper feeding to the first treating position. It has now been found that the adhesion between the wet face of a skin and a belt conveyor is sufficient to enable a skin to travel up a considerable incline without slipping, and this factor has been utilized in determining the position of the upper idler roller 17 of the feed conveyor relative both to the unhairing drum 6 and the outer or feed idler roller 18.

To maintain the proper tension on the several belts, one of the idler rollers of each is made adjustable transversely of its axis in the conventional manner. It will also be noted that each of the conveyor belts has associated with it a belt-centering device 19 by which its position axially of the associated drums or rollers is maintained. The device is comprised of an idler roller 20 extending transversely across and underlying a return portion of the associated belt. This roller is supported by a post 21 mounted on the frame and rotatable about an axis normal to the confronting face of the belt. Projecting from the post below the transverse roller and opposite the direction of travel of the belt, are a pair of upslanting, divergent arms 22 carrying at their end rollers 23, which are disposed normal to the belt and embrace its opposite sides. With this device, creepage of the belt toward either side will displace the confronting of the arm-carried rollers 23 and, through it, rotate the post 21 a like amount. The corresponding angular displacement of the transverse roller 20 applying a component of force to the belt opposing the creepage, the roller will then drive the belt toward the opposite side until both are restored to their normal positions.

At both the unhairing and fleshing positions, a skin supported on the corresponding supporting drum through the related of the conveyor belts is treated by a pair of bladed cylinders or cutters, the cylinders of each pair being positioned at spaced stations about or along the periphery of the drum. In order of position, the first and second bladed cylinders or cutters, 24 and 25, respectively, comprising the unhairing pair, are designed to rotate oppositely with their unhairing blades 26 converging adjacent the unhairing drum, the first cutter thus rotating counter-clockwise and the second, clockwise, in the view of Figure 5. This same relation obtains in the third and fourth cutters, 27 and 28, respectively, of the fleshing drum, their fleshing blades 29 also converging adjacent the fleshing drum and the cutters rotating clockwise and counter-clockwise, respectively. Thus, the first and third cutters act in the direction of travel of a skin, while the second and fourth cutters oppose this travel.

Working on a skin in convergent directions, the cutters of each pair, alone, could not be utilized for spreading or stretching a skin taut, as is essential if the treatment is to be substantially uniform. However, such action is not contemplated, each cutter being intended to work on substantially one-half of a skin and, except when so working, being moved to inoperative position, in the manner to be hereinafter described. It is therefore essential that other means be provided which will coact with each cutter during its operative cycle to spread or stretch a skin therebetween and, at the same time, will enable the exposed surface of the skin to be treated in its entirety by each pair of cutters in its passage through their treating zone. This is here accomplished by the provision for each drum of a pair of grip rolls, one leading and the other following the associated pair of cutters relative to the direction of travel of a skin through the apparatus. The leading or first and trailing or second grip rolls of the unhairing drum are numbered 30 and 31, respectively, and the corresponding or third and fourth rolls of the fleshing drum, 30a and 31a, respectively. Of these grip rolls, the first grip roll 30 bears directly against a skin, while the remaining grip rolls all bear on a skin through an intervening conveyor belt. As such direct engagement might cause a skin to stick to the grip roll 30, the latter is preferably intergeared with the unhairing drum 6, as shown in Figure 23, such that the grip roll has a slightly higher peripheral speed, an advance of as little as one-quarter of an inch per revolution having proved adequate to prevent sticking. The other grip rolls presenting no such problem, are driven through their associated conveyors.

The grip rolls of each pair are positioned about the associated drum in spaced stations between which are included the stations of the associated cutters. Additionally, the rolls of each pair are disposed relative to the path of travel of the related belt so as to be partially wrapped or encircled by the belt as it reaches and leaves the drum. Partially wrapped by the related belt outwardly of the drum, each grip roll changes the direction of the belt and imparts to it a reverse or S-bend outwardly of the adjacent cutter. By pressing or urging its belt against the drum intermediate the reverse bend, each grip roll by virtue of the partial wrap, assisted by the arcuate path described by the belt about the drum between the roll and the adjacent cutter, applies a force to the belt and to a skin carried thereon which opposes the force of the adjacent cutter. If the angular distance about the associated drum between each grip roll and its adjacent or companion cutter is not less than 100°, the roll and cutter, alone, will coact or cooperate during the operative cycle of the cutter, effectively to grip a skin to the drum and to stretch the skin taut therebetween. This minimum distance between grip roll and coacting cutter must be maintained with respect to the second and succeeding grip rolls 31, 30a and 31a, which act on a skin through an intervening conveyor. However, the first grip roll 30, which directly engages a skin, is preferably provided with opposed, helical ribs, such as disclosed in my aforementioned copending applications Serial Nos. 703,571 and 42,652, and with the grip provided by the ribs, can be set at a less distance from the associated cutter 26. The first grip roll having opposed helical ribs, the illustrated cutters having blades of like configuration, and the setting-out of a skin so obtained on the unhairing drum 6 being maintained intermediate the drums by gripping a skin during its transfer between opposing conveyors, the coaction of the rolls and cutters spreads the skin both longitudinally and laterally and presents it in smooth condition for action by the cutters, enabling the presented face of the skin to be treated uniformly and in its entirety in each treating zone.

It has been mentioned that the grip rolls are yieldably or resiliently urged against the associated of the supporting drums, 6 and 7. Due to space limitations, two types of mountings have been employed in the illustrated embodiment for mounting the shafts 32 of the grip rolls, both of which provide the desired action, one type being utilized for the leading grip roll 30 of the unhairing drum 6 and the other type on the remaining three grip rolls, 31, 30a and 31a. This first type consist of a yoke 33 bolted or otherwise attached to the outer face of each of the sides 3 of the frame 1, the yokes having jaws 34 at their inner ends confronting the drum journal-mounting openings 10 in the sides, between which jaws, journals 35 carrying the ends of the grip roll shaft 32 are slidably mounted. To the upper end of each journal, and projecting substantially radially of the unhairing drum, is rotatably connected the lower end of a connecting rod 36 having a threaded lower portion carrying a pair of adjustable lock nuts 37. Above the nuts, the rod is encircled by a coil spring 38 bearing against a lower plate 39, in which the upper end of the rod is slidably received, the plate being connected and fixedly spaced relative to an upper plate 40 by bolts 41 encircled by sleeves 42. The upper plate 40 is, in turn, adjustably spaced from the upper end of the yoke by a threaded bolt 43 and suitable nuts 44. To guide the plates, 39 and 40, and at the same time permit ready disassembly of the mounting, the ends of the plates, crosswise of the yoke, are slidably received in slots 45 formed in abutments 46 fixed to and projecting inwardly of the sides of the yoke. With this construction, the springs 38 of the companion mountings are enabled to provide the yieldable or resilient force necessary for the grip roll 30 to press the feed conveyor 11 against the unhairing drum 6, and the force so applied is readily adjusted through the adjusting lock nuts 37. As the grip roll is designed to be driven through the unhairing drum 6 by the intergearing of Figure 23, it is necessary that this driving engagement be maintained, despite yielding of the grip roll. This is accomplished by utilizing intergearing sufficiently deep-toothed to accommodate the comparatively small reciprocable movement of the grip roll relative to the drum.

The other type of grip roll mounting for the rolls 31, 30a and 31a, is comprised of a pair of flanged beams 47, each having one end pivotally attached to the outer face of one of the sides 3, and having bolted to it, intermediate its ends, one of the journals 48 carrying the ends of the shafts 32 of the associated grip roll. The other or outer end of the beam is pivotally connected to the end of a threaded bar 49 telescoping within a partially threaded tube 50, the latter having its outer end slidably received in a yoke 51 through which it is attached to the frame. Adjustment of the length of the telescoping unit is obtained through an internally threaded collar 52 rotatably connected to the threaded tube and threadedly engaging the threaded bar. The outer ends of the companion beams of each grip roll are resiliently or yieldably urged inwardly, correspondingly moving the grip roll and causing it to press the confronting portion of the associated belt against its supporting drum, by coil springs 53 encircling the threaded tube 50, the force of which is adjustable through adjusting lock nuts 54, carried by the threaded tube.

To obtain the intermittent operation required of the several skin treating cutters, 24, 25, 27 and 28, in order to limit the operation of each to a portion of the surface of a skin, provision is made for moving the cutters substantially radially of their associated drums and for normally holding them in their out or inoperative positions. Mounting of the cutters to permit such movement is obtained in a manner similar to that employed for the first grip roll 30. There is thus provided for each cutter a pair of yokes 55, each fixed to an opposite outer face of the sides 3 and having its open end, confronting the drum openings 10, provided with confronting jaws 56, between which are slidably mounted journals 57 carrying the ends of the shafts 58 of the cutters. Yieldable urging of the cutters toward their associated drums and adjustment of this force is obtained by the same type of mechanism as that utilized for the aforementioned grip roll, there being provided for each of the journals a partially threaded connecting rod 59 rotatably connected to the journal and projectible or slidable at its upper end through a lower plate 60 against the force of a rod-encircling spring 61. This plate is, in turn, spacedly connected to an upper plate 62 to which is attached the lower end of a piston rod 63 of a piston (not shown) reciprocable in a fluid pressure cylinder 64. On the application of fluid pressure to the cylinders of each cutter through solenoid actuated control valves 65, the piston rods and connected structure forming the sliding units of companion mountings are enabled to be moved radially of the associated drum and correspondingly move the cutter carried thereby. Guiding of the upper and lower plates, 60 and 61, of each unit in their sliding or reciprocable movement, without interference with disassembly, is accomplished by abutments 66 projecting inwardly of the sides of the yoke and grooved to receive the lateral edges of the plates.

Figure 1:
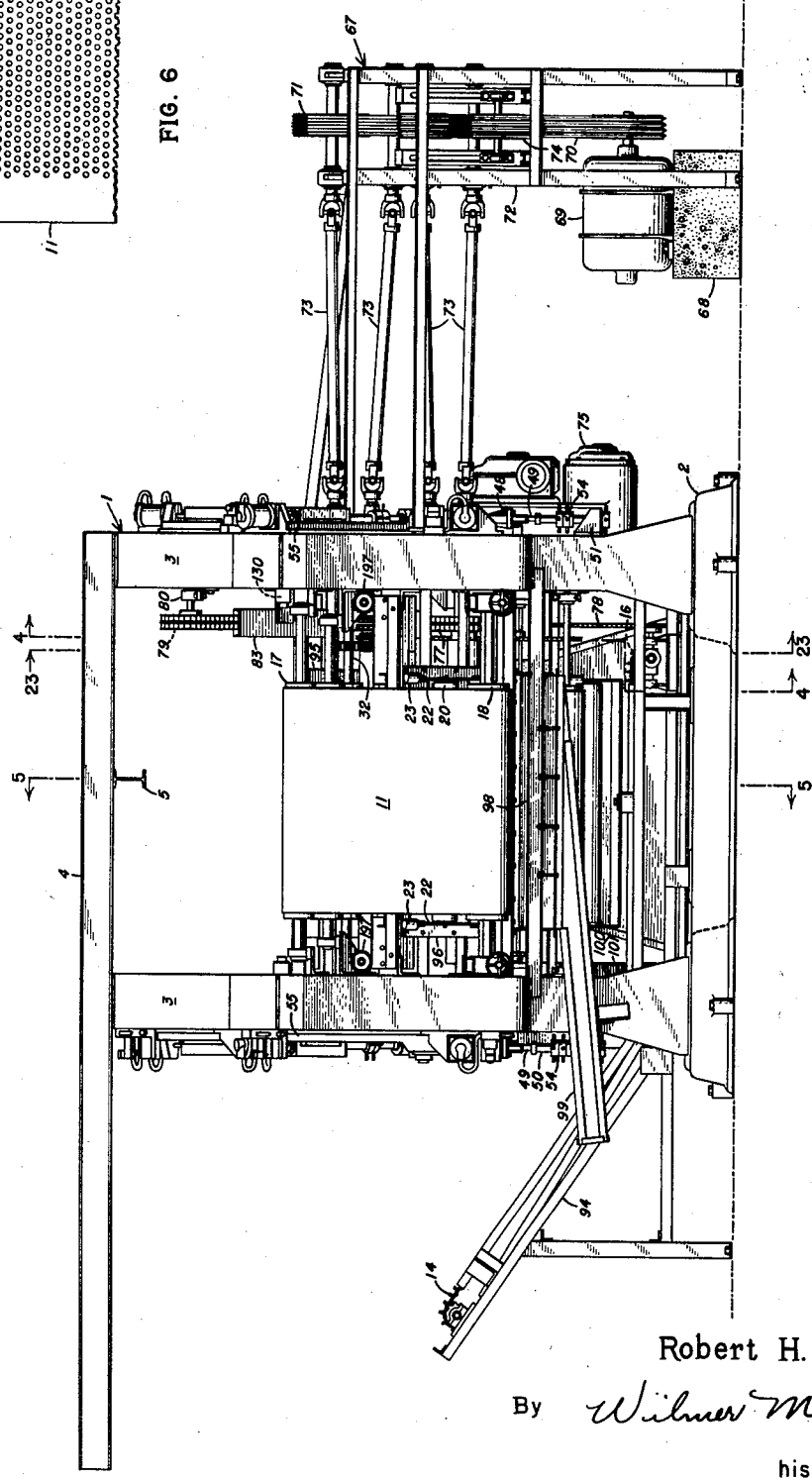
Figure 1 is a front elevational view of a preferred embodiment of the skin treating apparatus of the present invention.
Figure 2:
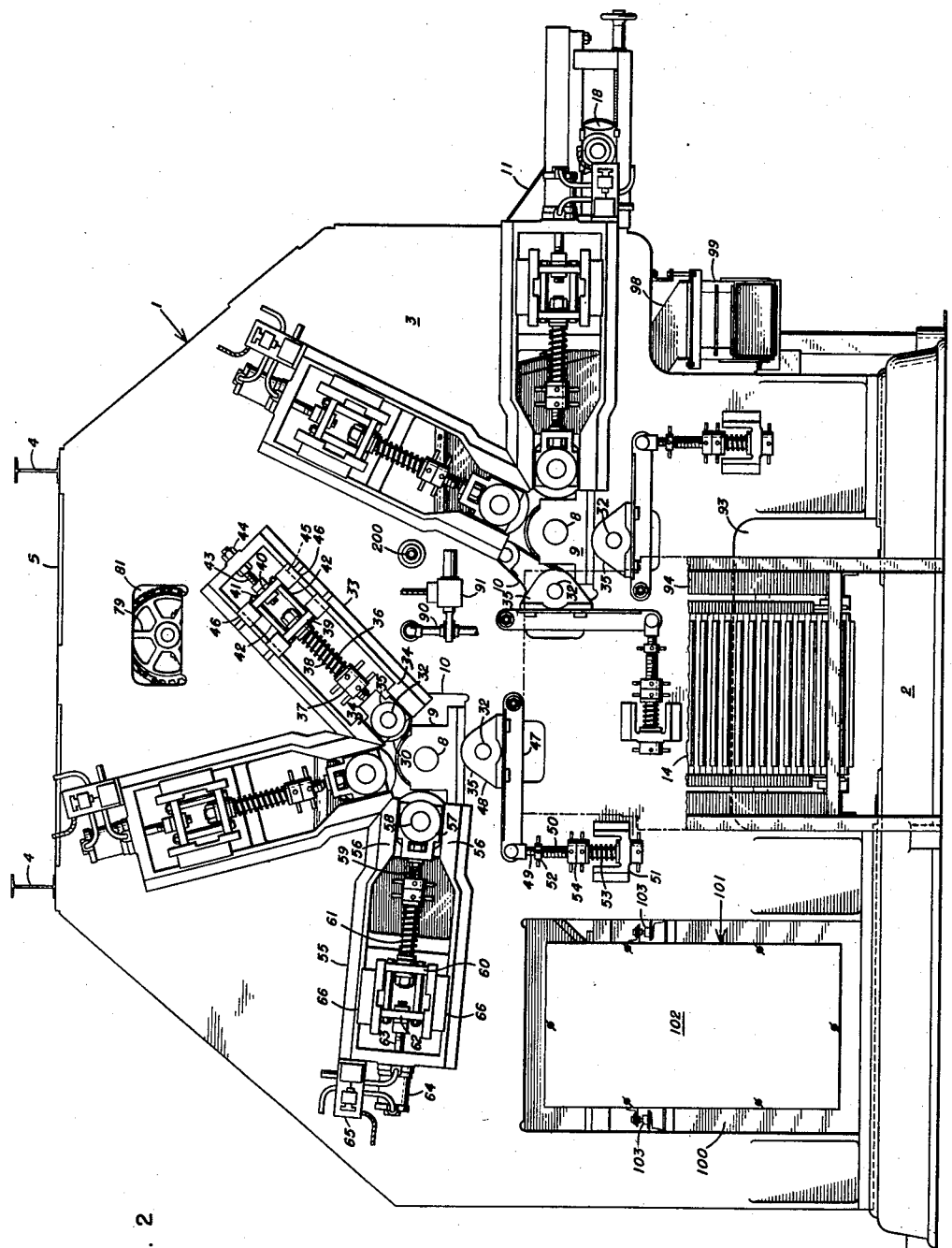
Figure 2 is a side elevational view of the apparatus, taken from the left side of Figure 1, with a portion of the side of the frame broken away to more clearly depict the discharge conveyor.
Figure 3:
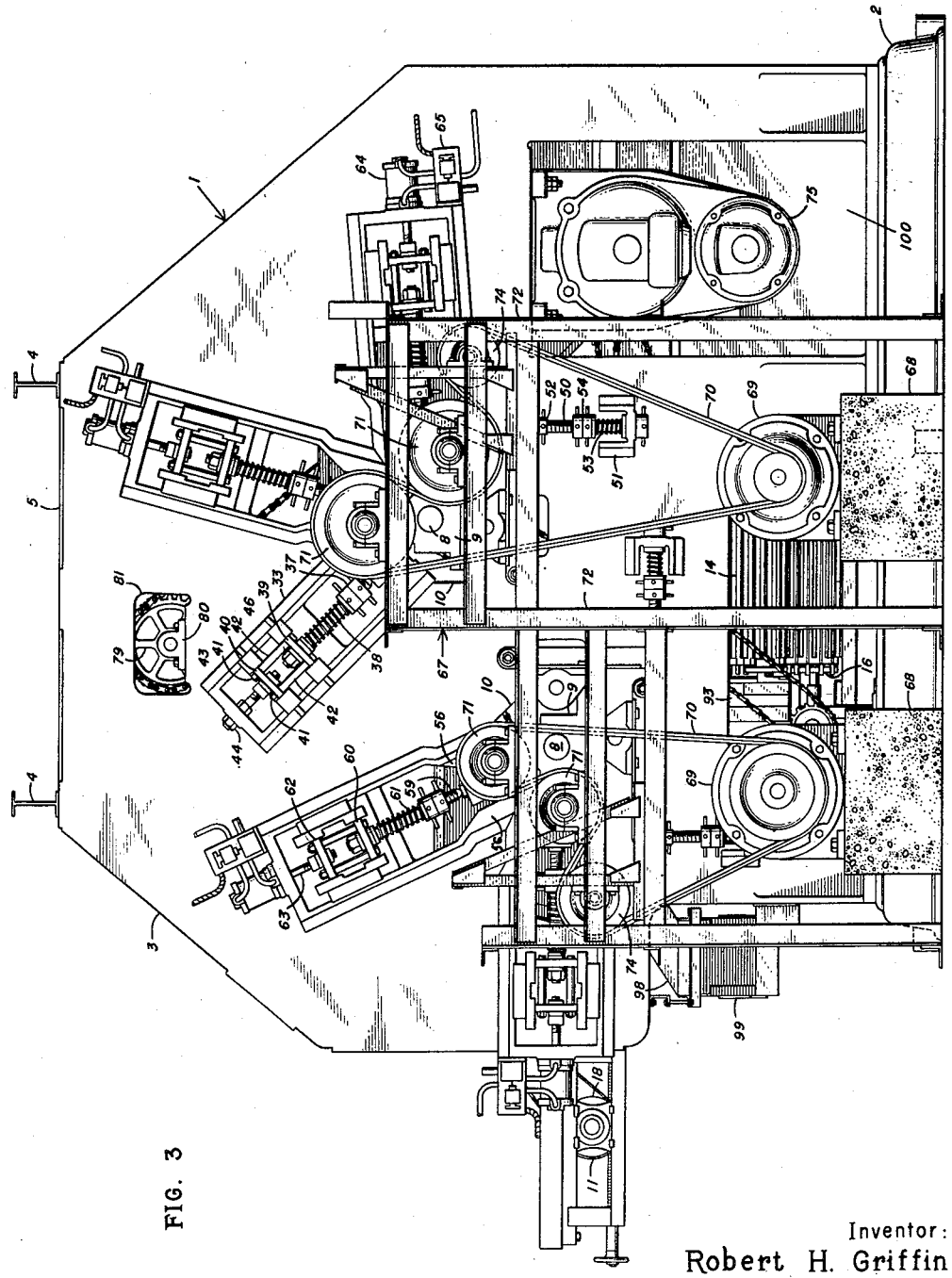
Figure 3 is a side elevational view of the apparatus, taken from the right side of Figure 1.
Figure 4:
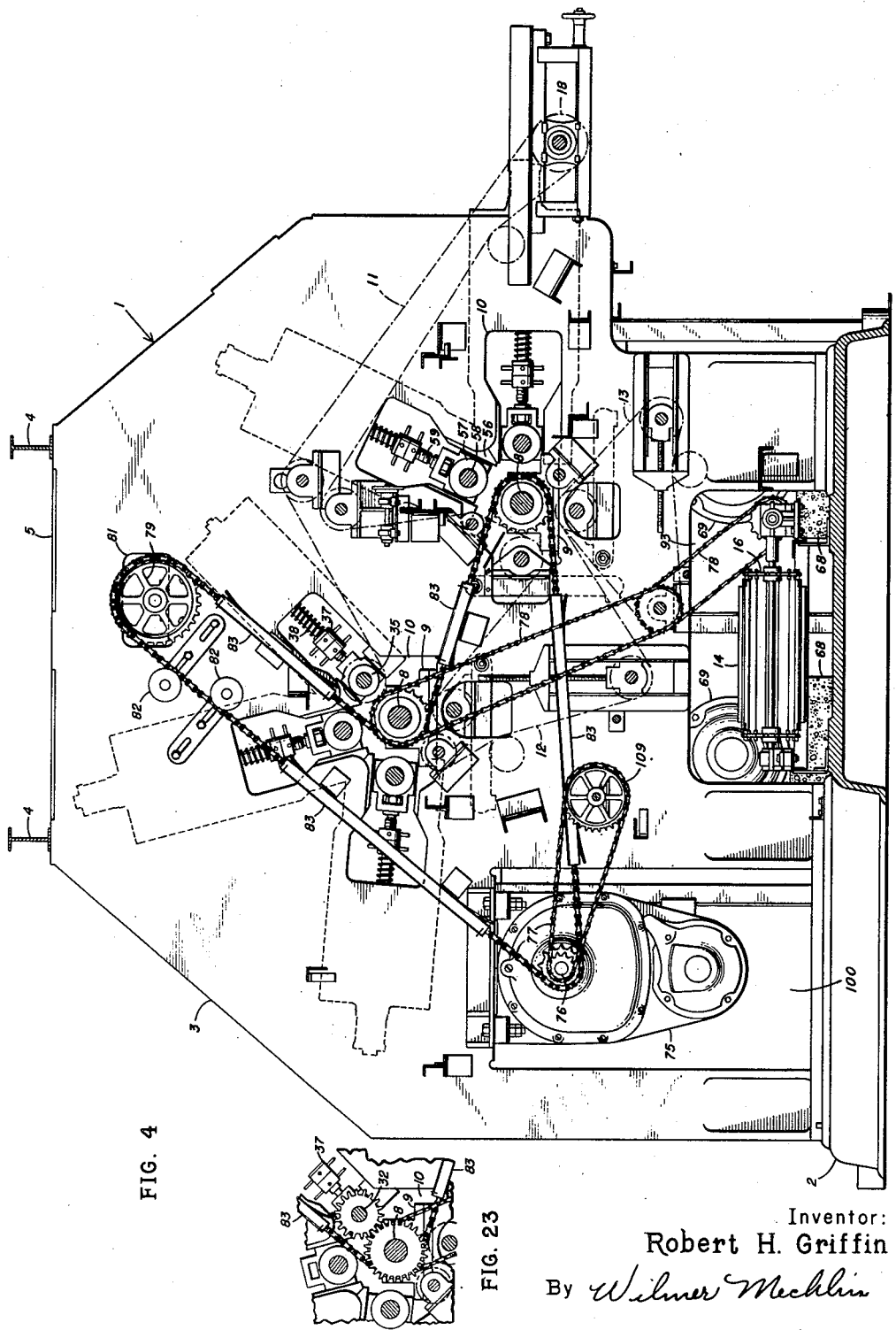
Figure 4 is a vertical sectional view, taken along the lines 4—4 of Figure 1.

The drives by which the various moving parts of the apparatus are driven are best shown in Figures 1, 3 and 4. For driving the several cutters, there is preferably provided, to one side of the frame 1, a drive stand 67 in which are mounted, on concrete blocks 68, a pair of electric motors 69, one for driving the unhairing cutters, 24 and 25, and the other the fleshing cutters, 27 and 28. These motors drive their associated cutters by multiple V-belts 70 through drive pulleys 71 mounted on the frame work 72 of the drive stand, and each drivably connected to one of the cutters through a universal shaft 73 to allow for the reciprocable movement of the cutters. The drive pulleys 71 are of such size and so connected to their associated motors through idler pulleys 74 as to cause the related cutters of each pair to be rotated in the aforementioned divergent directions and at the speeds required for most efficient operation. A. C. motors being generally used because of the relative availability of such current, any desired variations in the speeds of the cutters may be obtained in suitable manner, such as by the substitution of drive pulleys of different sizes.

The other rotary elements or members of the apparatus may be driven by a single motor unit 75 mounted on one of the sides 3 of the frame, the unit including an A. C. electric motor (not shown) driving through vari-pulleys (not shown) by which the speed of its drive or drive member 76 can be varied over a wide range. The drivable connection between the drive unit and the several members is preferably obtained by dual chain drives 77 drivably connecting the drive member 76 directly to the unhairing and fleshing drums, 6 and 7, and to the drive pulleys, 15 and 16, of the end and discharge conveyors, 13 and 14, through single chain drives 78 driven off the unhairing drum. To drive the drums in opposite directions, an idler is required for the main drive and for this purpose an idler sprocket 79 is carried by a bracket 80 mounted in an aperture 81 adjacent the upper end of the contiguous side of the frame. The tension of the main drive may be maintained by adjustable tensioning pulleys 82 and the chain may be supported, intermediate the rotary members, by guide sleeves 83, incorporating the usual guide rollers and wick chain lubricating elements (not shown). As shown in Figure 1, the supporting drums and their associated mechanisms are offset toward one side of the frame in order to accommodate the chain drives.

With the several conveyor belts, 11, 12 and 13, and the discharge conveyor 14 driven through their associated supporting drums and drive pulleys, a skin laid by an operator flesh side down on the feed conveyor 11 at the feed end of the apparatus, will be carried by that conveyor over its upper idler roller 17 under the leading grip roll 30 of the unhairing drum 6 and over the drum to the first and second cutters, 24 and 25. After the skin has passed the second cutter, it is met by the intermediate conveyor 12 which is adapted to abut or engage and merge in path with the feed conveyor from that point to the fleshing drum. The skin is therefore gripped between these conveyors as it passes the trailing grip roll 31 of the unhairing drum and the leading grip roll 30a of the fleshing drum. Intermediate the latter grip roll and the third cutter 27, the feed and intermediate conveyors separate, the feed conveyor returning over suitable idler rollers to the feed end of the apparatus and the intermediate conveyor encircling the fleshing drum 7 and carrying the skin past the third and fourth cutters, 27 and 28. Beyond the fourth cutter 28, the path of the intermediate conveyor merges with that of the end conveyor 13, such that the skin is gripped therebetween as it passes under the last grip roll 31a. Beyond this roll, the paths of the two conveyors separate, the skin thereafter being carried by the end conveyor until deposited on the discharge conveyor 14 for discharge from the apparatus.

It will be evident that the skin, when passing over the unhairing drum 6, has its hair side exposed and is reversed in transfer to the fleshing drum 7 to there expose its flesh side. There being considerable adhesion between the flesh side of the skin and the feed conveyor 11, provision is made for positively disconnecting or detaching the skin from the feed conveyor at the point of separation of the latter from the intermediate conveyor 12. This is here accomplished by a fluid pressure device 84, preferably in the form of the water spray shown in detail in Figure 7. As there illustrated, the device comprises an open-bottomed box 85 mounted on the frame 1 by a bracket 86 and in which is slidably received an open-topped box member 87, the box member having its bottom wall 88 covered by a layer of rubber or like material 89, which extends the width of and is adapted to abut against the inner face of the feed conveyor. As indicated in Figures 6 and 7, the bottom wall 88 and its contact layer 89, as well as the feed conveyor, are perforate or foraminous to permit passage of fluid therethrough against the flesh side of the skin. This fluid is supplied to the box 85, under sufficient pressure to detach or disconnect the skin from the feed conveyor, through a conduit 90, the flow of fluid being controlled by a solenoid actuated valve 91.

Detachment of a skin at the proper time from the intermediate and end conveyors, 12 and 13, to ensure its transfer to the discharge conveyor 14 is accomplished by the provision of a pair of scrapers 92, one of which extends across each of the conveyors beyond the last grip roll 31a and resiliently bears on the outer face of the conveyor. To supplement the action of the scrapers, there is preferably provided, just ahead of each, a water or other fluid spray (not shown) for injecting fluid between the skin and the associated conveyor, across the width of the latter. These sprays may be cyclically actuated in the manner hereinafter described for so actuating the spray 84. However, since not subject to the space limitations of the spray 84, these supplemental sprays need not act through the conveyors but may be positioned to direct fluid at a slant against the outer faces of their conveyors. Since no fluid need pass through the intermediate and end conveyors, 12 and 13, they are preferably made of solid rubber or like suitable material. The discharge conveyor 14 may be of like construction, but has been shown as a slatted contiuous conveyor which, after passing through an opening 93 in the adjacent side of the apparatus, follows an inclined ram 94 to bring the skin to suitable height for loading on horses or other carriers used in transferring the unhaired and fleshed skins to succeeding tanning operations.

As a skin is treated by the cutters in its passage through the apparatus, by-product waste is produced in the form of hair and flesh in the two treating zones. It is presently the practice in a tannery to allow this waste to accumulate on the floor of the beam-house, from whence it is shovelled into containers and removed at frequent intervals, this necessitating frequent hosing of the floor with consequent interruption of the operation of the beam-house machines. In the instant apparatus, the cutters of each pair act convergently and throw their wastes toward each other, each thus assisting the other in directing the waste and by this coaction limiting the path over which the waste is thrown. Accordingly, accumulation of waste on the floor is here readily avoided by directing the waste, as it is severed from the skin, into hoppers, one an unhairing hopper 95 for the unhairing drum 6 and the other, a fleshing hopper 96 for the fleshing drum 7. Each hopper projects over and partly encloses both of the associated cutters, with its upper end portion 97 open only on the side confronting the cutters. These upper end portions are connected in each hopper to funnel sections 98 which lead, for the fleshing hopper to a discharge chute 99 and for the unhairing hopper, to an open-bottomed bin 100, there to be collected for removal in suitable containers, or a continuous water-carrier disposal system.

Driven at all times during the operation of the apparatus by a pair of motor 69, the cutters are designed automatically to treat or operate upon a skin in cycles timed in relation to passage or travel of a skin through the apparatus. To this end, there may be mounted on the side of the apparatus opposite that of the drive mechanism a control box 101, having a removable cover 102, in which is housed an electronic control or timer unit. To avoid any possibility of breakage of the elements of the unit by shock, the control box is connected to the side of the frame through shock-proof mountings 103. The upper portion of the control box is occupied by an electromagnetic timing device, the central element of which is a recorder or control disk 104, keyed or pinned to a rotating drive shaft 105 carried by a split journal 106 mounted on spaced crossbars 107 in the box. This shaft projects outside the box and there carries a sprocket wheel 108 through which it is drivably connected by a reduction chain drive 109 to the drive 76 of the motor unit 75. The recorder disk is intended to encompass, in a full revolution, the passage of skin from a reference point through the several treating zones, the reduction ratio in the illustrated embodiment being about 3.3:1.

Ranged or disposed about the recorder disk 104 and overlying its periphery are a plurality of magnetic heads 110, each carried by a head holder or mounting bracket 111 slidably mounted radially of the recorder disk on a substantially U-shaped, slotted or bifurcated slide piece or block 112, the slide piece embracing the opposite sides and overlying the periphery of a stationary positioning plate 113 and being connected, on either side of the plate, to spaced guide arms 114. The stationary plate is, in turn, fixed to an annular flange 115 of a sleeve bearing 116 about which the guide arms 114 are adapted to rotate. This sleeve bearing also serves as a bearing for the drive shaft 105 of the recorder disk 104, within which the shaft is freely rotatable. To prevent induced rotation of the sleeve bearing, the end portion of the bearing, beyond the guide arms 114, is held by the split journal 106 which, in turn, is anchored to the spaced cross-bars 107 by a base plate 117. Adjacent the sprocket wheel end of the shaft 105, the base plate supports a pillow block 118 carrying a second sleeve bearing 119 for journaling that end of the shaft. As shown, the pairs of guide arms of the several magnetic heads are interleaved and spaced at progressively greater distances from the positioning plate 113 such that they are individually adjustable about the plate, the inner ends 120 of the inner arms serving as spacers for the outer arms. For fixing any of the magnetic heads at a predetermined position circumferentially of the positioning plate, the periphery of the latter is grooved and adapted to receive an adjusting screw 121 threadedly engaging the slide piece 112 of each head, and extending radially of the plate, tightening of this screw setting the particular head at any desired circumferential position. Adjustment of the spacing between each magnetic head and the periphery of the recorder disk 104 is provided by a second adjusting screw 122, rotatably connected to or collared by an offset or lug 123 formed in the associated head holder 111 and threadedly engaging the slide piece, this screw also being disposed substantially radially of both disk and plate.

It has been mentioned that the control disk 104 is rotated at a predetermined or given ratio or speed relative to the linear speed of the conveyor belts and that a complete rotation of the disk includes the entire pass of a skin. The lineal relationship so fixed between the periphery of the disk and the conveyors, which causes the periphery to move in coordination, consonance or accordance with the linear movement of the conveyors, is utilized to enable the disk and its associated heads electronically to control the operation of the several operating devices in timed relation to the passage of a skin through the apparatus. For this purpose, the body 124 of the recorder or control disk is made of stainless steel or other non-magnetic material, and its periphery is formed of a continuous band, tape or strip 125 of magnetic material which is plated or otherwise applied to the disk. Each of the magnetic heads 110 confronting the magnetic strip is formed of an open-bottomed shell 126, housing a cylindrical, split magnetic core or ring 127 disposed normal to the control disk and having a minimum magnetic gap for sharp definition. About the core is the usual winding 128 from which extend leads 129. These electromagnets carried by the magnetic heads are severally employed to apply a magnetic signal to the magnetic tape, pick up pulses or impulses from the signal and erase the signal, during a single rotation of the disk. The picked up pulses are, in turn, employed to operate, energize or actuate, through electronic circuits, the solenoid actuated valves 65 and 91, controlling the operation of the cutters and water sprays.

Figure 14:
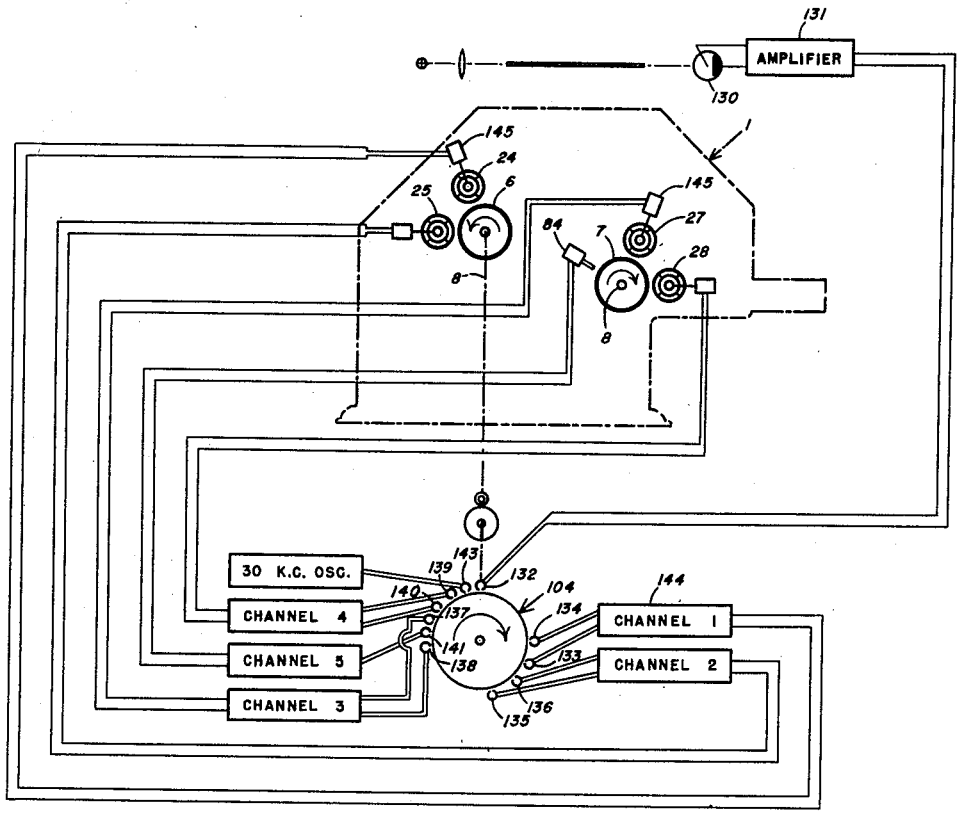
Figure 14 is a schematic view showing the relation between the electronic control mechanism and the cyclically operating elements of the apparatus.

Referring now to Figure 14, there is there shown diagrammatically the relationship between the operating devices and the electromagnetic control. For starting a cycle of operation, there is employed a suitably sensitive electric switch, preferably in the form of a photoelectric cell 130, mounted on the frame 1 at one side of the feed conveyor 11 in advance of the unhairing drum 6 and its associated operating devices, and positioned to be energized by a beam of light passing across the outer face of the conveyor, the beam, in turn, being so positioned relative to the conveyor that it will be interrupted or intercepted by any part of a skin on the conveyor. The cell 130 is electrically connected through an amplifying circuit 131 to one of the magnetic heads which serves as a recording or inducing head 132 and induces magnetism in the tape 125, the magnetized portion or magnetic signal or recording commencing at the moment the light beam is interrupted by the leading edge of a skin and continuing along the tape until the light beam is restored by passage of the trailing edge of a skin past the photoelectric cell. Travelling at a fixed linear speed relative to the conveyor and having its limits set by the time of passage of the leading and trailing edges of a skin past a fixed reference point, the photoelectric cell 130, the magnetic signal is a scale image of a skin and corresponds, reflects or is related directly to the skin undergoing treatment in both limits and speed of travel. Accordingly, by providing for the several operating devices pickup heads, disposed circumferentially relative to the recording head 132 in positions determined by the linear positions of the operating devices relative to the photoelectric cell, the electromagnetic control is enabled to control the action of the operating devices in timed relation to the passage of a particular skin through the apparatus.

Figure 8:
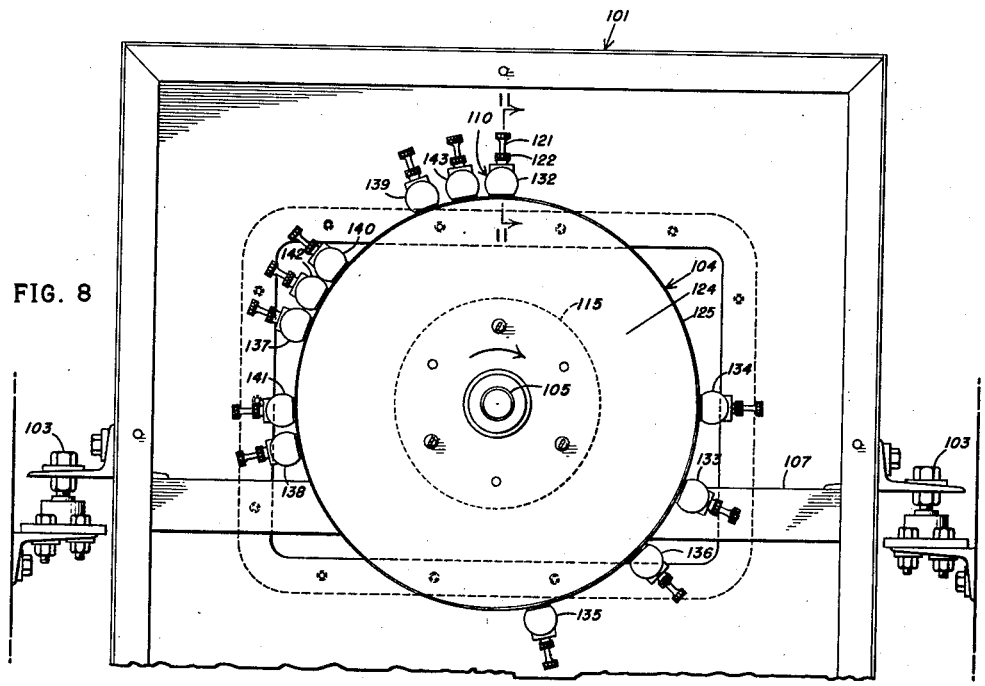
Figure 8 is a fragmentary front elevational view on an enlarged scale of the upper portion of the control box of the apparatus with the cover removed to show the details of construction of the magnetizable recorder disk and related mechanism.
Figure 10:
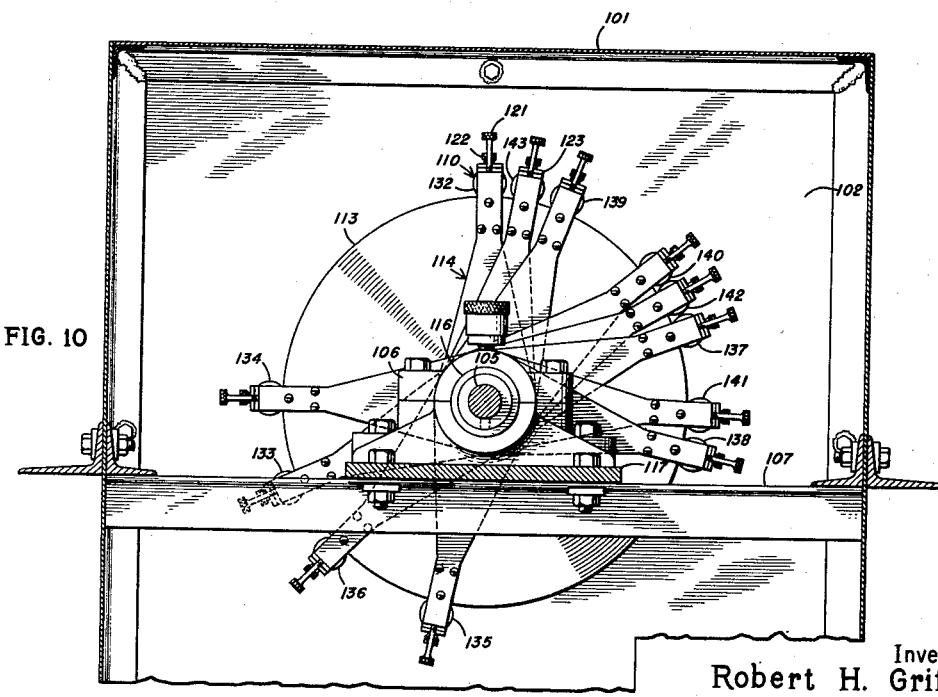
Figure 10 is a vertical sectional view on the scale of Figure 8, taken along the lines 10—10 of Figure 9.

An image of the skin undergoing treatment, the magnetic signal on the tape 125 first reaches the pair of magnetic heads controlling the first or leading unhairing cutter 24, the cutter-in or operative head being numbered 133 and the cutter-out or inoperative head 134, both of which are connected to the cutter through an electronic control circuit designated as Channel 1 on the corresponding block of Figure 14. Next, the signal reaches the cutter-in and out heads, 135 and 136, respectively, of the second unhairing cutter 25 and later, the cutter-in and out heads, 137 and 138, respectively, of the third or first fleshing cutter 27 and those, 139 and 140, respectively, of the fourth or second fleshing cutter 28. In advance of the in head 137 of the third cutter, the magnetic signal passes the spray-on or operative head 141 of the water spray 81 and, if one is employed, later an off head 142 for the spray, such as shown in Figure 8. On the diagram of Figure 14, in which the spray has only an on head, the control circuits of the second, third and fourth cutters and the water spray are identified on the corresponding blocks as Channels 2, 3, 4 and 5, respectively. While not shown, a sixth channel, similar to Channel 5 and common to the water sprays of the intermediate and end conveyors, 12 and 13, may be employed for operating these sprays. Beyond the pick-up heads, the magnetic signal passes under an erasing head 143 to which a high frequency alternating current is applied, as by the designated 30 kilocycle oscillator, to effectively erase all magnetism from the tape and present it in clear or non-magnetized condition for further magnetizing by the recording head 132 as succeeding skins break the light beam to the photoelectric cell 130.

Figure 15:
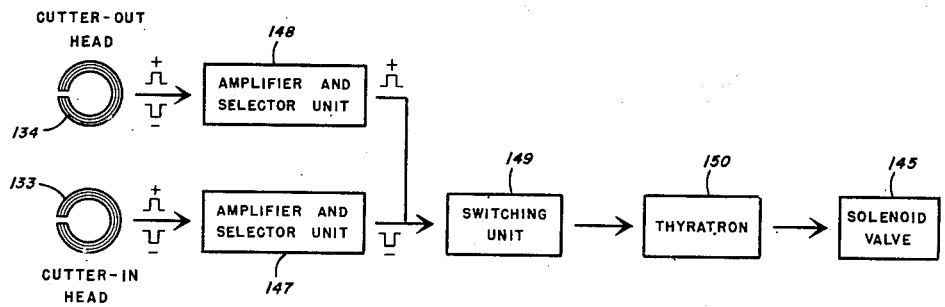
Figure 15 is a block diagram of the control circuit of a typical cutter.
Figures 16, 17:
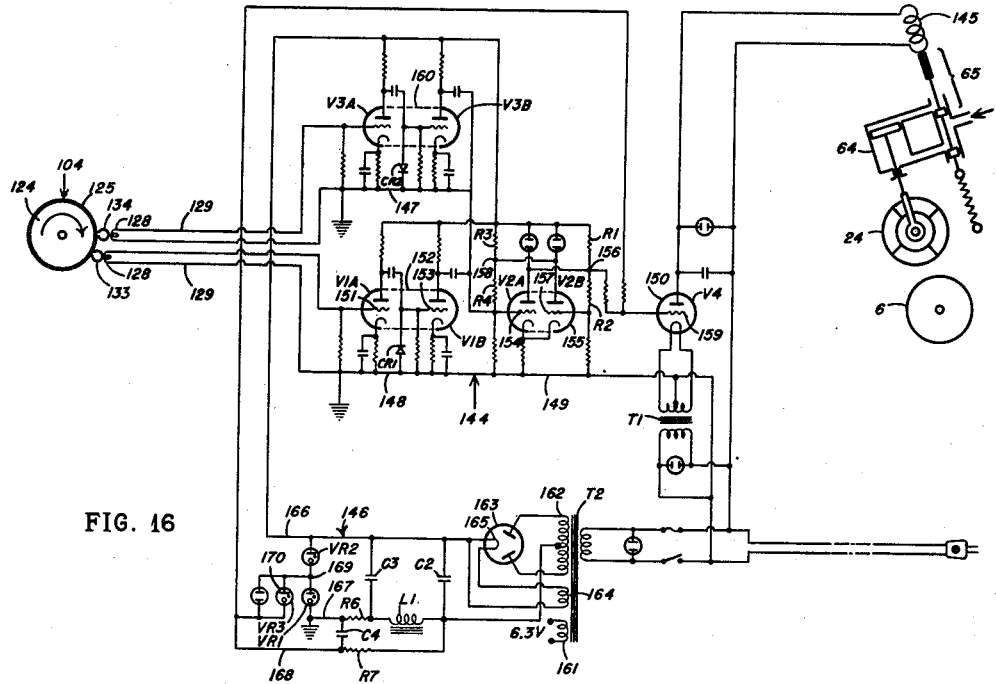
Figure 16 is a wiring diagram typical of the power supply and control circuits by which each of the several cutters is actuated.
Figure 17 is a wiring diagram of an alternative circuit for actuating the fluid pressure device by which a skin may be detached from the feed conveyor.

The wiring diagram of an electronic control circuit 144 of Channel 1, typical of the control channels of all of the pick-up heads, and suitable for actuating the solenoids 145 of the solenoid actuated valves, 65 and 91, and a connected power supply circuit 146 for supplying special plate, grid and heater voltages to all of the control circuits, has been illustrated in Figure 16. As shown in the block diagram of Figure 15, the control circuit comprises, essentially, amplifying and selecting units 147 and 148 for the in head 133 and out head 134, respectively, of the first cutter 24, which are connected to a common switching unit 149, controlling operation of a power unit 150 by which the solenoids 145 are energized and deenergized.

Considering the in or lower head 133 and first its amplifying and selecting unit 147, the winding 128 of the head is connected through one of its leads 129 to the grid 151 of the first section or tube unit V1A of a resistance-coupled, double triode or two-stage amplifier 152 so as to apply thereto a negative or minus electrical pulse induced in the head by the impulse received from the leading edge of the magnetic signal on the tape 125. This negative pulse is amplified and passed to the grid 153 of the second section or triode V1B as a positive pulse. From the unit 147, the amplified pulse, now negative, is fed to the grid 154 of the first section V2A of a second double triode, a multistage feed-back or switching tube 155, constituting the switching unit 149. By momentarily stopping the flow of plate current from section V2A, this negative pulse causes the potential at junction 156 between the voltage-dividing resistors R1 and R2 to increase and, therethrough, increases the potential on the grid 157 of a second section V2B of the tube. The resulting increase in the flow of plate current from section V2B reduces the potential at the junction 158 between the resistors R3 and R4, further reducing the potential on the grid 154 of section V2A and clamping that section at cut-off. The initially increased potential at junction 156 is thus further increased, correspondingly raising the potential on the grid 159 of a thyratron V4 of the power unit 150 to firing potential. This thyratron derives its power from the usal 110 volt, 60 cycle outlet through a transformer T1 and transmits this power to the solenoid 145, energizing the latter and moving the first cutter to operative position.

A positive or plus pulse of opposite sign or polarity will, of course, be induced and applied to the grid 151 of section V1A by the trailing edge of the magnetic signal on the tape, forming a negative pulse at the plate of the section, but this pulse is shunted or shorted to the ground by a crystal rectifier or other one-way electronic valve CR1 interposed between the sections V1A and V1B and arranged to offer a low impedance to positive pulses and a high impedance to negative pulses. A positive pulse originated by the head thus is blocked by the rectifier and has no further effect upon the circuit. However, the same positive pulse is transmitted through the amplifying and selecting unit 148 of the out head 134. This unit also has a resistance-coupled, triode or amplifier 160, but its crystal rectifier CR2, interposed between the sections V3A and V3B of this triode, is arranged to shunt or short out any positive pulses in the plate current of V2A, thus blocking the initially negative pulses passed by the selecting unit 147 of the in head 133, but passing any initially positive pulse as an amplified positive pulse to the grid 154 of the first section V2A of the switching tube 155. Since positive, the pulse momentarily increases the flow of plate current from section V2A, thereby decreasing the potential at the junction 156 and, correspondingly, that on the grid 157 of the second section V2B, interrupting the flow of plate current from that section and, consequently, increasing the potential at the junction 158. The potential on the grid 154 or V2A is thereby further increased, clamping that section in conducting condition and further reducing the potential at junction 156, in turn, lowering the potential on the grid 159 of the thyratron V4 below its operating potential. The initial positive pulse thereby shuts off the thyratron and deenergizes the solenoid 145, causing the cutter to return to inoperative position and ending its operative cycle.

As previously mentioned, actuation of the water spray 84 may be controlled by both on and off heads in the same manner as the several cutters. However, unlike the cutters, the action of the water spray is only essential on the leading portion of a skin, since once the leading edge of the skin is gripped by the second grip roll 31a, associated with the fleshing drum 7, the remainder of the skin will automatically be detached or drawn from the feed conveyor. Consequently, it is preferred to utilize for the spray only a single magnetic head switch will cut the spray on at the proper moment through a control circuit such as that described for the in heads of the cutters, and to cut off the spray at a definite time interval thereafter. This is accomplished by the circuit shown in Figure 17, which is tapped to the junction 156 of the control circuit 144 and connects that junction through a variable charging resistor R5 and parallel connected condenser C1 and gaseous triode or other valve tube V5, to the grid 154 of the first section V2A of the switching tube 155. The junction 156 being at least at the firing potential of the thyratron V4 when the spray is on, this potential will build up gradually on the condenser C1 through the charging resistor R5 until it reaches the firing potential of the tube V5. At that moment, the condenser will discharge through the tube V5, thereby applying a positive pulse to the grid of V2A and shutting off the solenoid in the same manner as did the positive pulse of the out head 134. By regulating the resistor R5, the operative cycle of the spray thus can readily be adjusted to cover the linear travel of the leading edge of the skin from the spray to or beyond the last grip roll 31a.

The power supply circuit 146 by which special voltages are supplied to the plates and heaters of the double triode tubes and the grids of the thyratrons of the control circuit 144, employs a transformer T2 connected to the 110 volt, 60 cycle alternating current source and having three secondaries; one, 161, supplying the conventional 6.3 volt heating current for various of the tube heaters, the second, 162, being center-tapped and converted into full-wave direct current by a full-wave rectifier 163, and the third secondary, 164, supplying the usual 5 volt alternating heating current for the cathode 165 of the rectifier. The rectifier circuit of the second secondary 162 has three leads; one, a positive lead 166 connected through suitable resistors to the plates of the amplifying and switching tubes of the control circuits, another, a ground lead 167, and the third, a negative lead 168 connected through resistors to the grids of the thyratrons. For converting the rippling, full-wave direct current output of the rectifier into the desired smooth, regulated voltages, there is connected in the ground lead 167 of the rectifier a filter choke L1 disposed between condensers C2 and C3, connecting the ground lead to the positive lead 166. Also connected across the ground and positive leads, and in series with a limiting resistor R6, are a pair of voltage regulator tubes VR1 and VR2. By employing a 105 volt tube as the lower tube VR1 and a 150 volt tube as the upper tube VR2, not only is the voltage in the positive lead regulated at the +250 volts direct current which is preferred for supplying the plate voltages of the double triodes of the control circuits, but there is afforded at a center tap or junction 169 between the tubes, a regulated voltage of +105 volts. Connected in parallel with the ground lead 167, is the negative lead 168 utilizing the same filter choke L1 and a condenser C4 to smooth out the direct current from the rectifier 163 and having a 150 volt voltage regulator tube VR3 connecting it to the positive lead 166 through the junction 169, the tube VR3 being connected in series with a limiting resistor R7. Drawing −150 volts from the negative lead 168 by virtue of its characteristics and having +105 volts transmitted to its plate 170 from the junction 169, the tube VR3 delivers to the negative lead of the grid 159 of the thyratron V4, a regulated direct current voltage of −45 volts, supplying the constant negative grid bias required for operation of the thyratron.

Using the electronic circuits, above described, for the operating devices, the electronic control, through the recorder disk 104, is enabled to cause each of the several operating devices cyclically to treat or act upon a skin as it passes the station of that device. As previously mentioned, each of the cutters, 24, 25, 27 and 28, as well as the spray 84, is brought into action upon a skin by the impulse generated in its in or on pick-up head by the leading edge of the magnetic signal initiated on the magnetic tape 125 by the passage of the leading edge of a skin past the photoelectric cell 130. So also, the action of the cutters and, if provided with an off pick-up head, the spray is stopped by the impulse generated in each of their out or off pick-up heads by the trailing edge of the signal, as determined by the passage of the trailing edge of the skin past the photoelectric cell. In setting up the cyclic control, the cutters 24 and 27 and the spray 84, which are designed to act upon the leading portion of a skin, are caused to begin acting upon the skin as its leading edge reaches their stations by setting their in and on heads, 133, 137 and 141, respectively, at distances, peripherally of the control disk, from the recording head 132 corresponding to the distances, linearly of the conveyors, of the associated operating devices from the photoelectric cell. The settings of the out heads, 136 and 140, of the second and fourth cutters, 25 and 28, which act upon the trailing portion of the skin, are predetermined in like manner by the distances, linearly of the conveyors, of these cutters from the photoelectric cell. The positions of the remaining heads, these the out heads, 134 and 138, of the leading portion cutters, 24 and 27, and the in heads, 135 and 139, of the trailing portion cutters, 25 and 28, as well as either the variable resistor R5 of the on head 141 or the position of the off head 142 of the spray, depending on which is used, controlling the interrelation of the cycles of the several operating devices and thereby the division of work, are adjusted to ensure complete treatment of both faces of the skins undergoing treatment.

Overlapping of the area treated by each pair of cutters in each treating zone merely reducing the relative work done by the trailing portion cutters, it is only necessary to ensure that each cutter will treat slightly over one-half of the exposed face of a skin of minimum length to enable the apparatus to handle effectively skins of greater length. Such a setting is shown in Figure 8 in which the pick-up heads have been adjusted to handle a skin as little as sixteen inches long. However, if it is desired to limit the extent of this overlap and thus increase the relative work done by the trailing portion cutters, this may be accomplished by shifting the positions of the heads controlling the relative action of the cutters. Since the magnetic signal on the tape 125 images the particular skin undergoing treatment, the electronic control, once set, enables that skin to determine both the start and finish of its treatment in each treating zone and the duration of the action of each of the operative devices. Consequently, the apparatus through the described electronic control can treat successive skins completely in exact correspondence with their lengths and, by always presenting a non-magnetized portion of the tape to the recording head 132, set up a new cycle for and cyclically treat a succeeding skin, immediately following its predecessor.

It will be evident that the illustrated apparatus is relatively more expensive than the beamhouse machines now in use and derives its commercial advantage thereover from its ability not only to remove all excess tissue in the form of flesh and hair from a skin in a single pass, but to process skins in much greater quantities and more uniformly than heretofore possible in a given number of man-hours. Thus dependent on quantity and quality processing, it is necessary that any interruptions of the operation of the apparatus be held to a minimum. The principal cause of such interruptions in existing machines is the necessity for refinishing the blades of the cutters. Unhairing cutters do not present a particular problem since the outer, rounded edges of their blades are relatively wear-resistant. However, the fleshing cutters are a different matter. Even in conventional machines, they are usually resharpened one or more times daily and the same cutters in the instant apparatus would have to be resharpened even more frequently, due to its high output. Did this involve removal for sharpening or replacement of the cutters, as is the usual practice, the apparatus would be out of operation a large part of the time. Accordingly, an important feature of the present invention is the grinding mechanism 171 by which these fleshing cutters, 27 and 28, are enabled to be sharpened in place or situ, thereby reducing to a minimum interval the shut-downs caused by wear of the fleshing blades.

Figure 19:
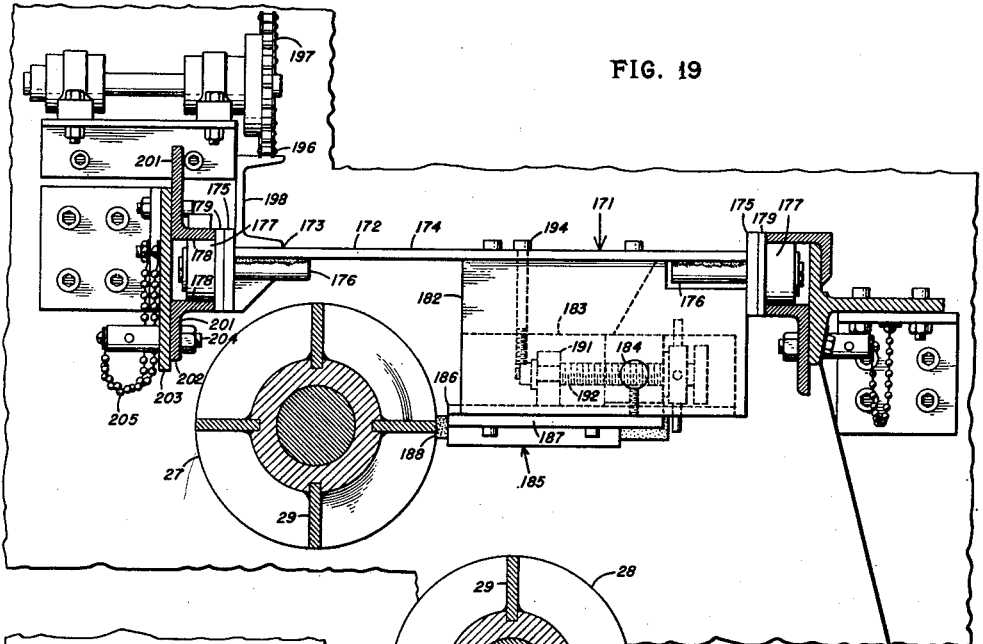
Figure 19 is a vertical sectional view on an enlarged scale, taken along the lines 19—19 of Figure 18.
Figure 20:
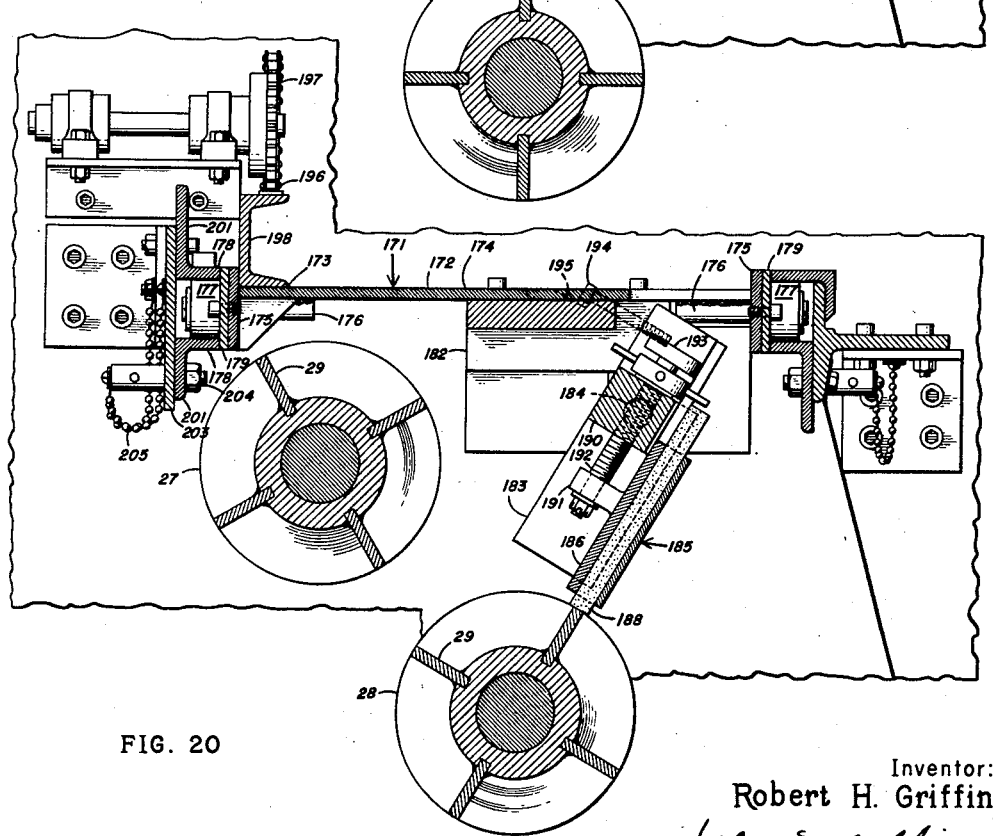
Figure 20 is a vertical sectional view on the scale of Figure 19, taken along the lines 20—20 of Figure 18, with the sharpening unit shifted into position to sharpen the lower fleshing cutter.

In its preferred embodiment, as shown in Figures 18–22, the grinding mechanism is comprised of a carriage 172 having a substantially I-shaped frame or body 173 formed of a cross or base plate 174 and spaced end plates 175, disposed substantially normal to the base plate. Projecting through the end plates on either side, are a pair of spindles or shafts 176 each mounting a roller or wheel 177. The rollers are adapted to ride in channel rails 178 extending across the frame 1 and disposed parallel to the axes of the fleshing cutters, 27 and 28, the end plates of the carriage being spaced from the edges of the rails by bearing plates 179 carried by the spindles 176 inwardly of the rollers 177. As shown in Figures 5 and 20, the channel rails 178 serve also to support the upper end of the fleshing hopper 96 and within the hopper are normally covered or protected from waste by flanges 180 forming part of a removable cover 181.

Suspended from and to one side of the body 173, and disposed longitudinally thereof, are a pair of spaced side plates 182 forming with the underface of the body a housing. Within this housing is a substantially H-shaped, supporting block 183, pivotally connected to the side plates 182 toward one end through pins 184 disposed normal to the other side plates, the block carrying below it a stone holder 185 which is slidably connected to the block through a slide plate 186 bearing on guides 187 attached to the underface of the block. In the stone holder 185 is supported or housed a grinding stone 188, the position of which, longitudinally of the block 183, is shiftable through screws 189 by which the stone holder is attached to the slide plate 186.

Extending through and threadedly engaging the connecting or central web 190 of the block 183, and rotatably collared by an upstanding lug 191 on the slide plate, is an adjusting screw 192 by which the position of the slide plate and, with it, the stone 188 may be adjusted relative to the block. This adjusting screw preferably is provided with an indicator dial 193 by which the extent of advance or bite of the stone can readily be set. The supporting block 183 is normally held in a substantially horizontal position, in which the grinding stone is disposed to grind the blades of the third cutter 27, as shown in Figure 19, the block being so held by bolts 194. On loosening of these bolts, the block may be swung to the position shown in Figure 20 for grinding the blades of the fourth cutter 28, being held in that position by the same bolts 194, then seated in a seat 195 provided for that purpose in the body 173. For driving the carriage 172 across the frame 1 to enable the grinding stone to engage and sharpen the cutting edges of the blades, there is provided a chain 196 encircling sprocket wheels 197, mounted and suitably journaled on the inner faces of the opposite sides 3 of the frame, the chain having its ends attached to the carriage through a channel or like member 198 upstanding from the body 173. One of the sprocket wheels 197 is driven through suitable gearing (not shown) housed in a gear box 199 and having a drive shaft 200 projecting through the adjacent side of the frame.

As shown diagrammatically in Figure 19, the carriage 172 is shifted, when not in use, toward one side of the frame 1, clear of the fleshing hopper 96. To permit removal of the carriage 172, for repair or other purposes, from the channel rails 178 in which they are normally locked, the angle irons 201, forming the lower sides of the rails, are provided, adjacent this side of the frame, with removable sections 202. Each of these sections is detachably connected to the associated rail-supporting or backing member 203 by a pair of bolts 204, which may be attached to the backing member by safety chains 205 to prevent their loss. On detachment of the removable sections 202, the carriage is enabled to be dropped through the rails and removed from the apparatus.

When sharpening of the fleshing blades 29 is required, the cover 181 and inner side of the upper portion 97 of the fleshing hopper 96 are removed and the grinding stone 188 is caused to traverse the face of one of the cutters by driving the carriage through the drive shaft 200, the extent of the bite of the stone having previously been determined by the setting of the adjusting screw 192. The cutter, of course, is rotated during this traverse to bring all of its cutting edges into contact with the grinding stone. The grinding may be repeated on reverse movement of the carriage, preceded, if necessary, by a further adjustment of the bite. The supporting block 183 is then swung down or up, depending on its previous position, to position the grinding stone to grind the blades of the other cutter and the operation repeated. Thereafter, the carriage is shifted to its inoperative position and the side plate and cover of the fleshing hopper 96 are replaced, enabling the treatment of skins to be resumed.

Summarizing the operation of the apparatus, skins are fed in succession to the apparatus by being laid flesh side down on the feed end of the feed conveyor 11. As each skin travels up the feed conveyor, its leading edge interrupts the light beam of the photoelectric cell 130, energizing the recording head 132 and setting up the cycle of operation of the electromagnetic control mechanism. The leading edge of the skin then passes under the leading grip roll 30 of the unhairing drum 6 and as it approaches the station of the first cutter 24, the latter is moved into operative position by energization of its control circuit 144 and begins to unhair the skin. This treatment continues until substantially one-half of the skin has been unhaired, the skin being held in unwrinkled, taut condition during this treatment by the coaction of the cutter and the adjacent or leading grip roll 30. The first cutter is then moved to inoperative position by the cyclic control and the second cutter 25 is brought into action to unhair the remainder of the exposed face of the skin, thereafter also moving to inoperative position. During this treatment, the leading edge of the skin has passed under the following grip roll 31 and ultimately reaches the point of separation of the feed conveyor and second conveyor 12, at which point the spray 84 is activated by the control mechanism to detach the skin from the feed conveyor and present it to the fleshing drum 7, with the flesh side exposed. The flesh side of the skin is then fleshed by the fleshing cutters, 27 and 28, which act on the skin in the same sequence as the unhairing cutters. With the excess tissue entirely removed from both of its faces, the skin is finally led from the apparatus by the discharge conveyor 14, where it is followed, almost immediately, by succeeding skins treated in the same manner.

From the above detailed description, it will be apparent that there has been provided an improved apparatus for treating sheet material which is particularly adapted for treating skins and is enabled, by its several parts and their relative arrangement, to treat the opposite faces of material in their entireties in a single pass through the apparatus, and to handle a succession of sheets in rapid sequence and as a continuous process. It should be understood that the described and disclosed embodiment is merely exemplary of the invention and that all modifications are intended to be included which do not depart either from the spirit of the invention or the scope of the appended claims.

Having described my invention, I claim:

1. Treating apparatus comprising a plurality of movable work supports arranged to receive and support work in sequence and each to present an opposite face of said work for treatment, means associated with each of said supports for treating the face of said work presented thereby, means acting through the presented face of said work against each of said supports and coacting with said treating means for gripping said work to said support and presenting said face in its entirety to said treating means, and control means actuated by said work to cause said treating means cyclically to treat said work in timed relation to passage of leading and trailing edges of said work past a reference point.

2. Treating apparatus comprising a plurality of spaced movable work supports, means associated with said work supports for conveying work thereto and therebetween and presenting an opposite face of said work for treatment at each of said supports, means associated with each of said supports for treating the presented face of said work, means acting through said presented face against each of said supports and coacting with said treating means for gripping said work to said supports and presenting said faces in their entireties to said treating means, and control means actuated by said work to cause said treating means cyclically to treat said work in timed relation to passage of leading and trailing edges of said work past a reference point.

3. Treating apparatus comprising a pair of spaced rotary drums arranged to receive and support work in sequence, a conveyor encircling each of said drums for conveying work thereto and presenting a face of said work for treatment thereon, said conveyors cooperating intermediate said drums for reversing said work and presenting a different face thereof for treatment on said second drum, means associated with each of said drums for treating said work, means associated with said treating means and acting on the presented face of said work for gripping said work to the associated drum and exposing said face in its entirety for treatment by said treating means, and control means actuated by said work for cyclically controlling treatment by said treating means in timed relation to the travel of said work therepast.

4. Treating apparatus comprising a pair of spaced rotary drums arranged to receive and support work in sequence, a conveyor encircling each of said drums for conveying work thereto and presenting a face of said work for treatment thereon, said conveyors cooperating intermediate said drums for reversing said work and presenting a different face thereof for treatment on said second drum, means associated with each of said drums for treating said work, means associated with said treating means of each drum and acting on the presented face of said work for gripping said work to the associated drum and exposing said face in its entirety for treatment by said treating means, switch means positioned in advance of said drums and tripped by said work, and control means actuated by said switch means and operating at a predetermined relation to the linear speed of said conveyor for cyclically controlling treatment by said treating means in timed relation to the travel of said work therepast.

5. Treating apparatus comprising a pair of spaced rotary drums arranged to receive and support work in sequence, a conveyor encircling each of said drums for conveying work thereto and presenting a face of said work for treatment thereon, said conveyors cooperating intermediate said drums for reversing said work and presenting a different face thereof for treatment on said second drum, means associated with said conveyor of said first drum for detaching said work from said conveyor adjacent said second drum, means associated with each of said drums for treating said work, means associated with said treating means of each drum and acting on the presented face of said work for gripping said work to the associated drum and exposing said face in its entirety for treatment by said treating means, and control means actuated by said work for cyclically controlling operation of said detaching and treating means in timed relation to the travel of said work therepast.

6. Treating apparatus comprising a pair of spaced rotary drums arranged to receive and support work in sequence, a conveyor encircling each of said drums for conveying work thereto and presenting a face of said work for treatment thereon, said conveyors cooperating intermediate said drums for reversing said work and presenting a different face thereof for treatment on said second drum, fluid pressure means associated with said conveyor of said first drum for detaching said work from said conveyor adjacent said second drum, means associated with each of said drums for treating said work, means associated with said treating means of each drum and acting on the presented face of said work for gripping said work to the associated drum and exposing said face on its entirety for treatment by said treating means, and control means actuated by said work for cyclically controlling operation of said fluid pressure and treating means in timed relation to the travel of said work therepast.

7. Skin treating apparatus comprising a pair of rotary work supports arranged to receive and support work in sequence and each to present a different face of said work for treatment, a plurality of rotary cutters associated with each support and movable into and out of treating position relative to said work, means exterior of each of said supports and coacting with said cutters for gripping said work to said supports and exposing said faces of said work in their entireties to said cutters in smooth condition, and control means actuated by said work for cyclically controlling treatment by said treating means in timed relation to the travel of said work therepast.

8. Skin treating apparatus comprising a pair of rotary work supports arranged to receive and support work in sequence and each to present a different face of said work for treatment, a pair of rotary cutters associated with each support and movable into and out of treating position relative to said work, gripping means exterior of each of said supports and positioned on opposite sides of each of said pairs of cutters, each of said gripping means acting against the associated support and coacting with the adjacent of said cutters for gripping said work to said support and exposing the presented face of said work to said cutter in smooth condition, and control means actuated by said work for cyclically controlling treatment by said treating means in timed relation to the travel of said work therepast.

9. Skin treating apparatus comprising a pair of rotary work supports arranged to receive and support work in sequence and each to present a different face of said work for treatment, a pair of rotary cutters associated with each support and movable into and out of treating position relative to said work, gripping means exterior of each of said supports and positioned on opposite sides of each of said pairs of cutters, said gripping means each acting against the associated support and coacting with the adjacent of said cutters for gripping said work to said support and exposing the presented faces of said work in their entireties to said cutters, and electronic control means actuated by said work for cyclically controlling treatment by said treating means in timed relation to the travel of said work therepast.

10. Treating apparatus comprising a movable work support, means associated with said support for treating work supported thereon, a magnetic tape movable at a speed corresponding to the movement of said support, means actuated by said work for magnetically recording on said tape a signal corresponding in limits to the passage of the limits of said work past a reference point, and means including a plurality of pick-up means arranged along said tape and each energized by one only of the limits of said signal for causing said treating means to treat said work in direct relation to the passage of work therepast.

11. Treating apparatus comprising a movable work support, treating means associated with said support for treating work supported thereon, solenoid actuated means for rendering said treating means operative and inoperative relative to said work, means actuated by passage of said work past a reference point for recording a magnetic signal corresponding in length and linear speed to said work, and electronic means energized by said signal for controlling the actuation of said solenoid actuated means and causing said treating means cyclically to treat said work in timed relation to the travel of said work therepast.

12. Treating apparatus comprising a rotary work support, treating means associated with said support for treating work supported thereon, solenoid actuated means for rendering said treating means operative and inoperative relative to said work, a control disk rotatable at a predetermined peripheral speed relative to the peripheral speed of said support, said disk having a magnetizable periphery, switching means associated with said support and positioned to be tripped by said work, recording means actuated by said switching means for recording a magnetic signal on said periphery corresponding in length and linear speed to said work, electromagnetic heads adjustably positioned about said disk and energized by said signal, and electronic means controlled by said heads for actuating said solenoid actuated means and causing said treating means cyclically to treat said work in timed relation to the travel of said work therepast.

13. Skin treating apparatus comprising a rotary drum, a conveyor encircling said drum for conveying a skin thereto and underlying said skin during treatment thereon, a plurality of treating devices positioned in spaced stations about said drum and acting on a presented face of said skin in convergent directions, and a plurality of gripping devices positioned about said drum in spaced stations including therebetween said stations of said treating devices, said gripping devices each pressing said conveyor against said drum and changing the direction of travel thereof outwardly of said drum, and said devices coacting to grip said skin to said drum and spread said skin for treatment by said treating devices.

14. Skin treating apparatus comprising a rotary drum, a conveyor encircling said drum for conveying a skin thereto and underlying said skin during treatment thereon, a pair of treating devices positioned in spaced stations about said drum and acting on a presented face of said skin in convergent directions, and a pair of pair of gripping devices each yieldably urging said conveyor against said drum and changing the direction of travel thereof beyond said drum, and each of said gripping devices coacting with the adjacent of said treating devices for gripping said skin to said drum and spreading said skin for treatment by said treating devices.

15. Skin treating apparatus comprising a rotary drum, a conveyor encircling said drum for conveying a skin thereto and presenting a face of said skin for treatment thereon, a pair of reciprocably movable rotary cutters positioned in spaced stations about said drum and adapted to act on said skin in convergent directions, said cutters normally being removed from said drum and being limited in action to a portion of said skin, and a pair of grip rolls positioned about said drum and changing the direction of travel tween said stations of said cutters, said grip rolls each yieldably urging said conveyor against said drum and changing the direction of travel thereof beyond said drum, and each of said grip rolls coacting with the adjacent of said cutters during action thereof on said skin for gripping said skin to said drum and spreading said skin for treatment by said cutters.

16. Skin treating apparatus comprising a rotary drum, a conveyor encircling said drum for conveying a skin thereto and presenting a face of said skin for treatment thereon, a pair of treating devices positioned in spaced stations about said drum and adapted to act on said skin in convergent directions, means for limiting said action of each of said treating means to a portion of the presented face of said skin, a pair of grip rolls positioned about said drum in spaced stations including therebetween said stations of said treating devices, said grip rolls each being partly encircled by said conveyor and pressing said conveyor against said drum, and each of said grip rolls coacting with the adjacent of said treating devices during action thereof on said skin for gripping said skin to said drum and spreading said skin for treatment by said treating devices.

17. Treating apparatus comprising a movable work support, means associated with said support for acting on work supported thereon, a magnetizable tape movable in coordination with said support, a plurality of electromagnetic heads positioned along the path of travel of said tape, one of said heads being responsive to leading and trailing edges of said work for impressing a signal on said tape corresponding in length to said work, a pair of said heads each inducing an electric pulse of one sign from the leading edge of said signal and a pulse of opposite sign from the trailing edge of said signal, an electronic unit connected to each of said pick-up heads and each transmitting a different of said pulses, electronic means connected and common to said units for starting and stopping action of said acting means in correspondence with alternation of said different pulses, and another of said heads positioned beyond said pick-up heads for erasing said signal.

18. Treating apparatus comprising a movable work support, means associated with said support for acting on work supported thereon, a continuous magnetizable tape movable in coordination with said support, a plurality of electromagnetic heads positioned along and adjustable relative to the path of travel of said tape, one of said heads being responsive to leading and trailing edges of said work for impressing a signal on said tape corresponding in length to said work, a pair of said heads each inducing an electric pulse of one sign from the leading edge of said signal and a pulse of opposite sign from the trailing edge of said signal, an electronic unit connected to each of said pick-up heads and each transmitting a different of said pulses, electronic means connected and common to said units for starting and stopping action of said acting means in correspondence with alternation of said different pulses, and another of said heads erasing said signal in advance of said impressing head.

19. Treating apparatus comprising a movable work support, a plurality of members spaced about said support for acting on work supported thereon, means for inducing alternate electrical pulses of opposite polarity in timed relation to travel of said work past said acting members, and electronic means associated with said inducing means for starting and stopping action of said acting members in correspondence with alternation of said different pulses.

20. Treating apparatus comprising a rotary drum, a conveyor encircling said drum for conveying work thereto and underlying said work thereon, a treating device associated with said drum for treating work supported thereon, and a grip roll spaced from said treating device at least 100° peripherally of said drum and partially wrapped by said conveyor, said grip roll overlying said work and cooperating with said treating device for gripping said work to said drum during treatment thereof.

21. Treating apparatus comprising a rotary drum, a conveyor encircling said drum for conveying work thereto, a pair of treating devices associated with said drum for treating work supported thereon, and a pair of grip rolls each coacting with one of said treating devices, one of said grip rolls being intergeared with and having a higher peripheral speed than said drum, and said other grip roll being spaced peripherally about said drum at least 100° from said treating device.

22. Skin treating apparatus comprising a plurality of rotary drums arranged to receive and support work in sequence, a conveyor encircling each of said drums for feeding work thereto and therebetween, rotary treating means associated with each of said drums for treating work supported thereon, and grip roll means companion to each of said treating means, certain of said grip roll means being spaced peripherally of the associated drum at least 100° from the companion treating means.

23. Skin treating apparatus comprising a plurality of rotary drums arranged to receive and support work in sequence, a pair of rotary cutters associated with each of said drums for treating work supported thereon, and a pair of grip rolls positioned about each of said drums at stations including the associated cutters, certain of said grip rolls being spaced peripherally about the associated drum at least 100° from the adjacent of said cutters and being partially encircled by the associated of said conveyors, and at least one of said grip rolls being intergeared with and driven at a higher peripheral speed than the associated of said drums.

24. Treating apparatus comprising a pair of spaced rotary drums arranged to receive and support work in sequence, a conveyor encircling each of said drums for conveying work thereto and presenting a face of said work for treatment thereon, said conveyors cooperating intermediate said drums for reversing said work and presenting a different face thereof for treatment on said second drum, a pair of rotary treating devices positioned in spaced stations about each drum and movable into and out of treating position relative to said work, a pair of grip rolls positioned about each drum in spaced stations including there-between said stations of said devices, certain of said grip rolls being spaced peripherally of the associated drum at least 100° from the adjacent of said devices and each yieldably urging the associated conveyor against said associated drum and changing the direction of travel thereof beyond said drum, each of said grip rolls coacting with the adjacent of said devices during action thereof on said work for gripping said work to said drum and spreading said work for treatment by said device, recording means movable in coordination with said conveyors for recording passage of limits of said work past a reference point, and means actuated by said recording for causing said treating devices to treat said work in timed relation to the passage of said work therepast.

25. Treating apparatus comprising a rotary drum, a conveyor encircling said drum for conveying work thereto and presenting a face of said work for treatment thereon, a treating device associated with said drum for treating said work, a grip roll spaced from said treating device at least 100° peripherally of said drum, said grip roll yieldably urging said conveyor against said drum and changing the direction of travel thereof beyond said drum, said grip roll coacting with said treating device during treatment of said work thereby for gripping said work to said drum, recording means movable at a fixed ratio to movement of said conveyor for recording passage of limits of said work past a reference point, and means actuated by said recording for causing said treating device to treat said work in timed relation to the passage of said work therepast.

26. Skin treating apparatus comprising a pair of spaced rotary drums, a conveyor encircling each of said drums for conveying a skin thereto and presenting a face of said skin for treatment thereon, said conveyors coacting intermediate said first and second drums for reversing said skin and presenting a different face thereof for treatment on said second drum, a pair of cutters positioned in spaced stations about each of said drums and reciprocable relative thereto to operative and inoperative positions, said cutters of each pair acting on said skin in convergent directions, a pair of grip rolls positioned outwardly of and including each of said pairs of cutters, certain of said grip rolls being stationed at least 100° peripherally of the associated drum from the adjacent of said cutters, said grip rolls each pressing the associated conveyor against said associated drum and changing the direction of travel thereof outwardly of said drum, and each of said grip rolls coacting with said adjacent of said cutters to grip said skin to said drum and spread said skin for treatment by said adjacent cutter, a rotary disk drivably connected to said drums and driven in coordination with said conveyors, recording means carried by said disk, fixed means spaced from said recording means for recording thereby a signal corresponding to travel of limits of a skin past a reference point, and means adjustably positioned about said disk and actuated by said signal for cyclically controlling operation of said cutters in timed relation to the travel of said skin therepast.

27. Treating apparatus comprising a movable work support, means associated with said support for treating work supported thereon, a member movable in coordination with said work support, recording means on said member, fixed means spaced from said recording means for magnetically recording thereon a signal corresponding in limits to travel of limits of said work past a reference point, and means including a plurality of pick-up means arranged along said recording means and each responsive to one only of the limits of said signal for causing said treating means to treat said work in timed relation to travel of said work therepast.

28. Treating apparatus comprising a movable work support, means associated with said support for treating work supported thereon, a member movable in coordination with said work support, recording means on said member, fixed means spaced from said recording means for magnetically recording thereon a signal corresponding in limits to travel of limits of said work past a reference point, and paired control means adjustable peripherally of said member and each responsive to one of the limits of said signal for causing said treating means to treat said work in direct relation to travel of said work therepast.

29. Treating apparatus comprising a movable work support, means associated with said support for treating work supported thereon, a member movable in coordination with said work support, recording means on said member, a fixed core electro-magnet spaced from said recording means for applying thereto a magnetic signal corresponding in limits to travel of limits of said work past a reference point, and paired control means adjustable peripherally of said member and each responsive to one of the limits of said signal for causing said treating means to treat said work in direct relation to travel of said work therepast.

30. In treating apparatus having a movable work support and treating means associated with said support for treating work supported thereon, a control mechanism comprising a member movable in coordination with said support, recording means on said movable member, a fixed core electro-magnet spaced from said recording means for applying thereto a magnetic signal corresponding in limits to limits of travel of said work past a reference point, and paired control means adjustable circumferentially of said member and each responsive to one of the limits of said signal for causing said treating means to treat said work in direct relation to travel of said work therepast.

References Cited in the file of this patent

UNITED STATES PATENTS

| Number | Name | Date |
| --- | --- | --- |
| 1,860,713 | Jones | May 31, 1932 |
| 2,169,754 | Beyster | Aug. 12, 1939 |
| 2,217,342 | Ladrach | Oct. 8, 1940 |
| 2,374,846 | Thresh | May 1, 1945 |
| 2,506,149 | Herzog | May 2, 1950 |